US011927027B2

(12) United States Patent
Birch et al.

(10) Patent No.: US 11,927,027 B2
(45) Date of Patent: Mar. 12, 2024

(54) SUPPORT FOOT

(71) Applicant: BIG FOOT SYSTEMS LIMITED, East Sussex (GB)

(72) Inventors: Sam Birch, East Sussex (GB); Emmanuel Oluwarounke, East Sussex (GB)

(73) Assignee: BIG FOOT SYSTEMS LIMITED, East Sussex (GB)

( * ) Notice: Subject to any disclaimer, the term of this patent is extended or adjusted under 35 U.S.C. 154(b) by 122 days.

(21) Appl. No.: 17/628,396

(22) PCT Filed: Jul. 10, 2020

(86) PCT No.: PCT/GB2020/051680
§ 371 (c)(1),
(2) Date: Jan. 19, 2022

(87) PCT Pub. No.: WO2021/014123
PCT Pub. Date: Jan. 28, 2021

(65) Prior Publication Data
US 2022/0364383 A1    Nov. 17, 2022

(30) Foreign Application Priority Data

Jul. 19, 2019  (GB) ..................................... 1910343

(51) Int. Cl.
*E04H 12/22*     (2006.01)
*F24F 13/32*     (2006.01)

(52) U.S. Cl.
CPC ..... *E04H 12/2238* (2013.01); *E04H 12/2261* (2013.01); *F24F 13/32* (2013.01); *E04H 12/2269* (2013.01); *F16M 2200/08* (2013.01)

(58) Field of Classification Search
CPC ............ E04H 12/2238; E04H 12/2269; E04H 12/2253; E04H 12/2261; E04H 17/009;
(Continued)

(56) References Cited

U.S. PATENT DOCUMENTS 738,850 A  *  9/1903  Schug ................. E04H 12/2269
                                                52/298
970,555 A  *  9/1910  Riley .................. E04H 12/2261
                                                52/302.5
(Continued)

FOREIGN PATENT DOCUMENTS

CA         2542371 A1     10/2007
CN        202452043 U      9/2012
(Continued)

OTHER PUBLICATIONS

International Search Report for corresponding Application No. PCT/GB2020/051680 dated Dec. 3, 2020, 8 pages.
(Continued)

*Primary Examiner* — Taylor Morris
(74) *Attorney, Agent, or Firm* — Seyfarth Shaw LLP (57) ABSTRACT

A support foot for securing a frame member on a supporting surface, comprising a base portion having a base surface for resting on said supporting surface; a central portion connected to the base portion, and a core having opposed first and second ends and a longitudinal axis extending between the first and second ends and configured to receive a frame member. The core comprises at least one resiliently deformable member extending from a root at the first end to a free distal end in a direction substantially parallel to the longitudinal axis and spaced from an inner surface of the central portion, whereby to form a gap into which the at least one resiliently deformable member can deform. The at least one resiliently deformable member is configured to deflect into the gap and away from an associated opposed surface. The at least one resiliently deformable member comprises a first surface configured to apply a first force to an outer surface of the frame member towards the associated opposed surface when the frame member is inserted into the core, and the at least one resiliently deformable member is configured to
(Continued)

secure the frame member against said opposed surface when the frame member is inserted into the core.

20 Claims, 7 Drawing Sheets

(58) Field of Classification Search
CPC . E04H 12/2284; F24F 13/32; F16M 2200/08; F16M 7/00; F16M 11/20; E04F 11/1814; E04F 11/1812; A47B 91/12; A47B 91/00; E06C 7/42; E01F 9/685; A47C 7/002
USPC .......................................................... 248/523
See application file for complete search history.

(56) References Cited

U.S. PATENT DOCUMENTS

| | | | |
|---|---|---|---|
| 3,302,909 A | 2/1967 | Walter | |
| 3,691,776 A * | 9/1972 | Hull | E02D 5/54 52/297 |
| 4,007,564 A | 2/1977 | Chisholm | |
| 4,596,489 A * | 6/1986 | Mariol | E01F 9/642 404/9 |
| 5,381,636 A * | 1/1995 | Kassardjian | B29C 45/14065 52/300 |
| 5,415,394 A * | 5/1995 | Hall | E01F 9/685 473/501 |
| 6,141,928 A * | 11/2000 | Platt | E04F 11/1814 52/832 |
| 6,213,452 B1 * | 4/2001 | Pettit | E04F 11/1812 248/527 |
| 6,572,069 B1 | 6/2003 | Patterson | |
| 6,948,283 B2 * | 9/2005 | Burkart | C08G 18/6692 52/169.9 |
| 7,243,473 B2 * | 7/2007 | Terrels | E04C 3/32 52/843 |
| 7,530,550 B2 * | 5/2009 | Fattori | E04H 17/1447 256/65.05 |
| 7,722,014 B2 * | 5/2010 | Godwin | E04H 12/2261 52/297 |
| 7,802,351 B2 * | 9/2010 | McGinness | E04H 12/2253 29/458 |
| 7,819,605 B2 * | 10/2010 | Heald | E04H 12/2269 40/607.1 |
| 8,240,097 B2 * | 8/2012 | Day | E02D 19/00 52/297 |
| 9,004,439 B2 * | 4/2015 | Gross | E04H 12/2269 248/507 |
| 9,554,649 B2 * | 1/2017 | Saich | H01Q 1/12 |
| 9,556,582 B2 * | 1/2017 | Pelletier | E02D 27/01 |
| 10,316,523 B2 * | 6/2019 | Yu | E04F 11/1817 |
| 10,344,483 B2 * | 7/2019 | Yu | E04F 11/1846 |
| 10,501,957 B1 * | 12/2019 | Borowiak | E04H 12/22 |
| 2007/0187564 A1 | 8/2007 | McGuire | |
| 2011/0240448 A1 | 10/2011 | Springer | |
| 2012/0131879 A1 * | 5/2012 | Bergman | E04F 11/1812 52/704 |
| 2015/0000716 A1 * | 1/2015 | LeAnna | E04H 12/2284 248/514 |
| 2015/0204061 A1 * | 7/2015 | Saich | E04D 13/12 248/188.9 |
| 2020/0306670 A1 | 10/2020 | Simon | |

FOREIGN PATENT DOCUMENTS

| | | | | |
|---|---|---|---|---|
| EP | 1113213 A1 | 7/2001 | | |
| EP | 2228501 A1 | 9/2010 | | |
| EP | 3342305 A1 * | 7/2018 | ............ | E02D 17/10 |
| GB | 2441737 A | 3/2008 | | |
| GB | 2468847 A * | 9/2010 | ............ | E02D 17/10 |
| GB | 2551830 A | 1/2018 | | |
| WO | 0126513 A1 | 4/2001 | | |
| WO | 2011123713 A2 | 10/2011 | | |
| WO | 2014020322 A1 | 2/2014 | | |
| WO | WO-2022039593 A1 * | 2/2022 | ......... | E04H 12/2246 |

OTHER PUBLICATIONS

Written Opinion for corresponding Application No. PCT/GB2020/051680 dated Dec. 3, 2020, 12 pages.
Search Report for corresponding Application No. GB1910343.1 dated Nov. 30, 2021, 3 pages.

* cited by examiner

SUPPORT FOOT

CROSS REFERENCE TO RELATED APPLICATIONS

This is a U.S. National Stage Application of, and claims the benefit to, PCT/GB2020/051680, filed Jul. 10, 2020, which claims priority to United Kingdom patent application s/n GB 1910343.1, filed Jul. 19, 2019, the contents of each is incorporated herein by reference in its entirety.

This invention relates to a support foot for securing a frame member on a support surface.

BACKGROUND

Support solutions for services and plant equipment on flat roofs typically use a framework to support different types of plant equipment. For example, air-conditioning units are often mounted on roof tops, and secured in place by a framework that allows access to the relevant piping inlets and outlets, as well as supporting ducting and electrical channels between the air-conditioning unit and the inside of the building. The framework is often secured to the rooftop by a series of support feet so as to provide a stable platform on which a heavy load can be secured.

Each support foot needs to connect to the framework to be effective. However, due to the different types of framework each potentially having a different profile, support feet are often not compatible with all types of framework. While the use of industry standard framework has helped mitigate some of this issue, there remain different sizes and types of standardised framework, not all of which are compatible with all types of support feet. Particularly, existing support feet may only be able to connect to different types of frame when the frame is inserted in a specific orientation. Therefore, it is desirable to provide a single support foot that can connect to a variety of different frames and allow for the frames to be inserted in multiple orientations.

As plant equipment is often located in exposed locations, such as a rooftop, and can be subject to constant mechanical loading, for example from vibrations and temperature changes due to the equipment operating and day/night changes, the support feet are often designed using more material than is necessary to ensure the feet are sufficiently strong and stiff so that they can be installed and left. It is therefore also desirable to provide a support foot that requires less material to manufacture, while maintaining the required levels of strength and stiffness to safely support heavy plant equipment.

A further disadvantage of the prior art is the lack of even distribution of load across the surface of the support foot. As the frame is typically inserted into a slot within the foot, and the slot is in direct contact with the ground, this enables the direct transfer of load from the slot to the ground. This results in a large proportion of the foot being left under-utilised, and a small proportion of the foot bearing the majority of the stresses. To avoid the high stresses causing damage to the foot, a thicker base is often incorporated to ensure the foot is sufficiently strong and can withstand the loads due to the plant equipment. Incorporating the thicker base also allows for the supported load to be more evenly distributed on the roof surface.

It is the object of the present invention to address at least some of these problems.

BRIEF SUMMARY OF THE DISCLOSURE

Viewed from a first aspect, the present invention provides a support foot for securing a frame member on a supporting surface, comprising a base portion having a base surface for resting on said supporting surface; a central portion connected to the base portion, and a core having opposed first and second ends and a longitudinal axis extending between the first and second ends and configured to receive a frame member. The core comprises at least one resiliently deformable member extending from a root at the first end to a free distal end in a direction substantially parallel to the longitudinal axis and spaced from an inner surface of the central portion, whereby to form a gap into which the at least one resiliently deformable member can deform. The at least one resiliently deformable member is configured to deflect into the gap and away from an associated opposed surface. The at least one resiliently deformable member comprises a first surface configured to apply a first force to an outer surface of the frame member towards the associated opposed surface when the frame member is inserted into the core, and the at least one resiliently deformable member is configured to secure the frame member against said opposed surface when the frame member is inserted into the core.

Thus, the present invention provides a support foot that can receive different types of frame for securing equipment on a support surface. Advantageously, the arrangement of the at least one resiliently deformable member does not restrict the orientation in which the frame member is inserted into the support foot.

The at least one resiliently deformable member may comprise a strut member configured to resist bending of the resiliently deformable member.

The central portion may comprise an abutting surface adjacent to the or each respective resiliently deformable member, against which the or each of the respective resiliently deformable members abuts when deflected to a maximum extent.

The first surface comprises a protrusion extending towards the associated opposed surface. The protrusion may comprise a vertical groove between the first surface and the opposed surface defining a sacrificial region that is configured to be deformed or removed during insertion of the frame member into the core. The sacrificial region may have a thickness in the range of 1 to 3 mm. The sacrificial region may have a thickness of 2 mm.

The core may further comprise a central post extending from the first end towards the second end and having securing means to secure the frame member to the core. The central post may further comprise at least one buttress extending from the first end towards the second end and configured, in use, to apply a second force to an inner surface of the frame member, whereby to grip the frame member. The second force may oppose the first force, and the outer surface and the inner surface may be opposed surfaces of a side of the frame member.

The post may comprise a second buttress on an opposed face of the central post to the first buttress. The second buttress may be configured, in use, to apply a third force to the inner surface of the frame member, and the second and third forces may be directed in opposed directions to exert an expansile force to opposed sides of the frame member.

One or more of the buttresses may comprise a depth, and the depth may reduce from the first end to the second end. Advantageously, this not only provides a wedge-like shape to centre the frame member as it is inserted into the core, but also provides a reaction force against the first force to pinch one or more sides of the frame member to grip the frame member. The more the frame member is inserted into the core, the greater the reaction force applied to the inner surface of the frame member and the tighter the grip. Where present, the second buttress provides a similar reaction force, but in response to the second force provided by the first buttress. The more the frame member is inserted into the core, the greater the expansile force due to the second and third forces, providing further grip on the frame member.

The central post may comprise at least one finger having a depth and extending from the first end towards the second end, and the depth of the finger may be greatest at a point between the first end and the second end.

The central post may comprise a first pair of opposed faces and a second pair of opposed faces arranged at 90 degrees to the first pair of opposed faces. The associated opposed surface may be a face of the central post.

The central post may have a square cross section when viewed along the longitudinal axis. The central post may further comprise a threaded hole. The threaded hole may be co-axial with the central post.

The core may comprise a plurality of resiliently deformable members each having a contact surface configured to contact a plurality of sides of the frame member. The plurality of resiliently deformable members may be arranged in a square arrangement. The plurality of resiliently deformable members may be located at the respective corners of the square arrangement. Thus, the resiliently deformable members may have L-shaped profiles enabling them to act as corner brackets for standard section frame members in any orientation. Advantageously, the arrangement of resiliently deformable members can not only secure frame members having a square or rectangular profile, but also those having one or two open faces, such as a U-shaped or L-shaped frame member, or those having openings such as slots distributed along one of the faces of the frame member.

The core may further comprise a plurality of nubs extending from the first end and having a first surface facing a corresponding opposed surface, and the plurality of nubs and at least one resiliently deformable member may be arranged to contact the frame member such that the contact points define a plane substantially parallel to the outer surface of the frame member when the frame member is secured within the core. The nubs may comprise a sacrificial region configured to be removed during insertion of the frame member into the core.

The central portion may be connected to the base portion by a plurality of bridge members at the first end.

The support foot may further comprise a wall member circumscribing the base portion, and the wall member may extend in a direction parallel to the longitudinal axis and away from the base surface.

This, in itself, is believed to be novel and so, in accordance with a further aspect of the present disclosure, the present disclosure provides a support foot for securing a frame member on a supporting surface, comprising a base portion having a base surface for resting on said supporting surface; a central portion connected to the base portion, and a core having opposed first and second ends and a longitudinal axis extending between the first and second ends located within the central portion and configured to receive a frame member. The support foot further comprises a wall member circumscribing the base portion wherein the wall member extends in a direction parallel to the longitudinal axis and away from the base portion. Advantageously, the wall member resists bending of the support foot when plant equipment is stabilised by the support foot and helps to stiffen the foot without requiring additional material to be distributed across the entire surface of the foot. As such, the wall member provides a sufficiently stiff foot which requires less material to produce compared to existing support feet.

Further, the wall member acts to resist bending caused by lateral loads applied to the support foot or internal stresses within the foot.

The wall member may have a thickness of between 3 mm and 5 mm. The wall member may have a thickness of 3 mm. The wall member may have a height of 10 mm. The wall member may have a height between 8 mm and 18 mm. The wall member may have a variable height.

The support foot may further comprise a second wall section disposed between the wall member and the central portion. The second wall section may substantially circumscribe the central portion. The support foot may comprise a drainage channel having a first port formed within the central portion and a second port formed within the wall member. Any of the first port and second may extend through the base portion. The drainage channel may further comprise a third port formed within the second wall section.

The support foot may further comprise a plurality of connecting members extending radially from the central portion to the base portion. The core may comprise a bottom surface, and the bottom surface may be spaced from the base surface, whereby to prevent the direct transfer of load from the core to the supporting surface. Where present, the second wall section may extend between the plurality of connecting members. Where present, any of the second and third ports may be formed adjacent to a wall connecting member.

This, in itself, is believed to be novel and so, in accordance with a further aspect of the present disclosure, the present disclosure provides a support foot for securing a frame member on a supporting surface, comprising a base portion having a base surface for resting on said supporting surface; a central portion connected to the base portion, a core having opposed first and second ends and a longitudinal axis extending between the first and second ends located within the central portion and configured to receive a frame member, and a plurality of connecting members extending radially from the central portion to the base portion. The core comprises a bottom surface, and the bottom surface is spaced from the base surface to prevent the direct transfer of load from the core to the supporting surface. By suspending the core off the base surface, the load is unable to be directly transferred to the support surface through the core. This is desirable, as it results in the load borne by the core to be transferred through the connecting members and be evenly distributed into the base of the support foot. As the mechanical stresses are not concentrated at the core, but are distributed through the base, the material making up the base is more efficiently used. Therefore, a thinner section of material is required, as the risk of stress-whitening and the consequential mechanical failure of the support foot is reduced. A further advantage of the connecting members is they act to further stiffen the support foot and therefore allow even less material to be used to provide the required level of stiffness of the support foot.

One or more of the plurality of connecting members may comprise a webbed section. One or more of the plurality of connecting members may comprise a curved upper edge. One or more of the plurality of connecting members may be connected to at least one other of the plurality of connecting members at the central portion.

The base portion may have an outer edge, and the plurality of connecting members may extend to the outer edge.

The base portion may have an inner edge offset in a radial direction from the central portion.

The base portion may have a first width when viewed in a first plane and a second width when viewed in a second plane. The first plane may be parallel and coincident with the longitudinal axis, the second plane may be parallel and coincident with the longitudinal axis and rotated about the longitudinal axis in a first rotational direction by an angle between 30 and 60 degrees, and the second width may be larger than the first width. Advantageously, the lobed profile, when viewed from above, allows the material between the lobes to be saved, thus creating a support foot with less material. Further, the lobed profile results in a more stable support foot, as the tipping point of the support foot is at the ends of the lobes which are now located further from the centre of the base.

One or more of the plurality of connecting members may extend across the base portion for a length substantially equal to the second width. One or more of the plurality of connecting members may extend across the base portion for a length substantially equal to the first width. The plurality of connecting members may have a thickness in the range of 3 to 5 mm. The plurality of connecting members may have a thickness of 3 mm.

In accordance with a yet further aspect of the present disclosure, the present disclosure provides a frame connector for connecting a frame member to a support foot having a base portion and a central portion connected to the base portion, whereby to secure the frame member on a surface, the frame connector comprising a collar member configured to be received by a central portion of a support foot, the collar member, and a core configured to receive a frame member and having opposed first and second ends and a longitudinal axis extending between the first and second ends. The core comprises at least one resiliently deformable member extending from a root at the first end to a free distal end in a direction substantially parallel to the longitudinal axis and spaced from an inner surface of the collar member, whereby to form a gap into which the at least one resiliently deformable member can deform. The at least one resiliently deformable member comprises a first surface configured to contact an outer surface of the frame member when the frame member is inserted into the core, and the at least one resiliently deformable member is configured to secure the frame member against an opposed surface when the frame member is inserted into the core.

BRIEF DESCRIPTION OF THE DRAWINGS

Embodiments of the invention are further described hereinafter with reference to the accompanying drawings, in which.

DETAILED DESCRIPTION

Figure 1:
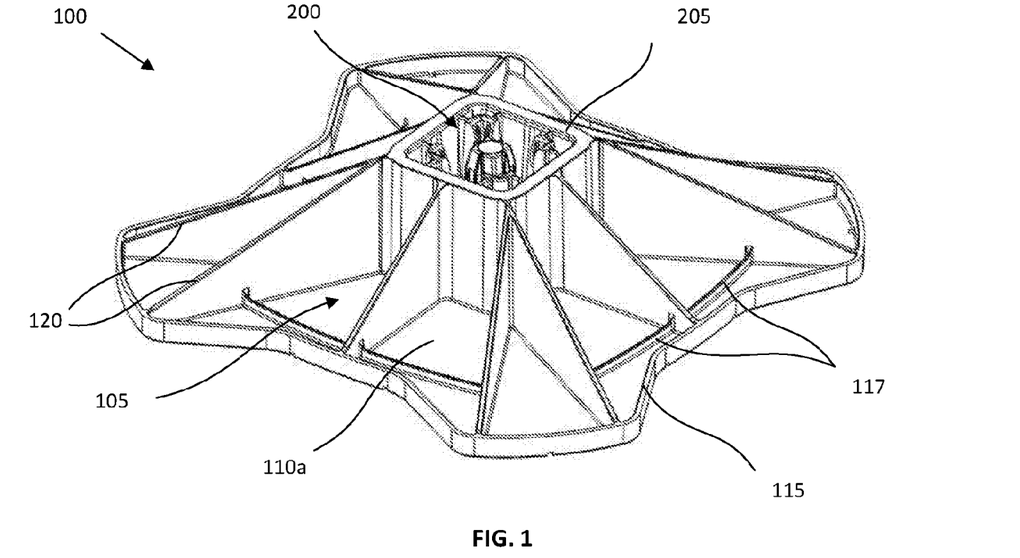
FIG. 1 illustrates a perspective view of a support foot having a base and a core.
Figure 2:
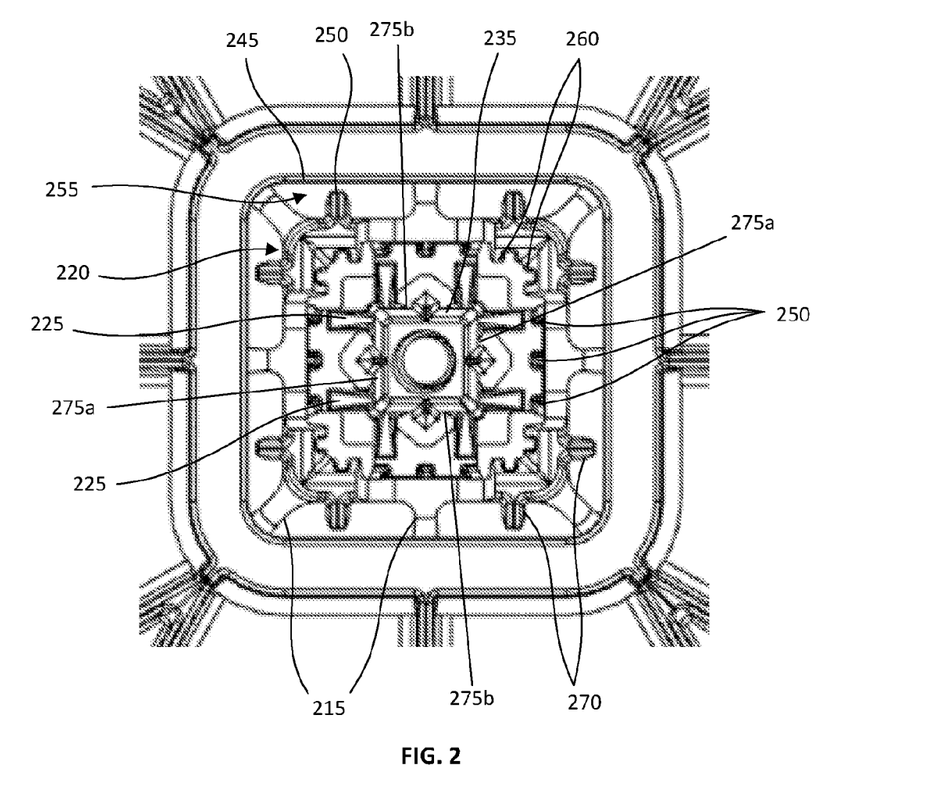
FIG. 2 illustrates a plan view of the core.
Figure 3:
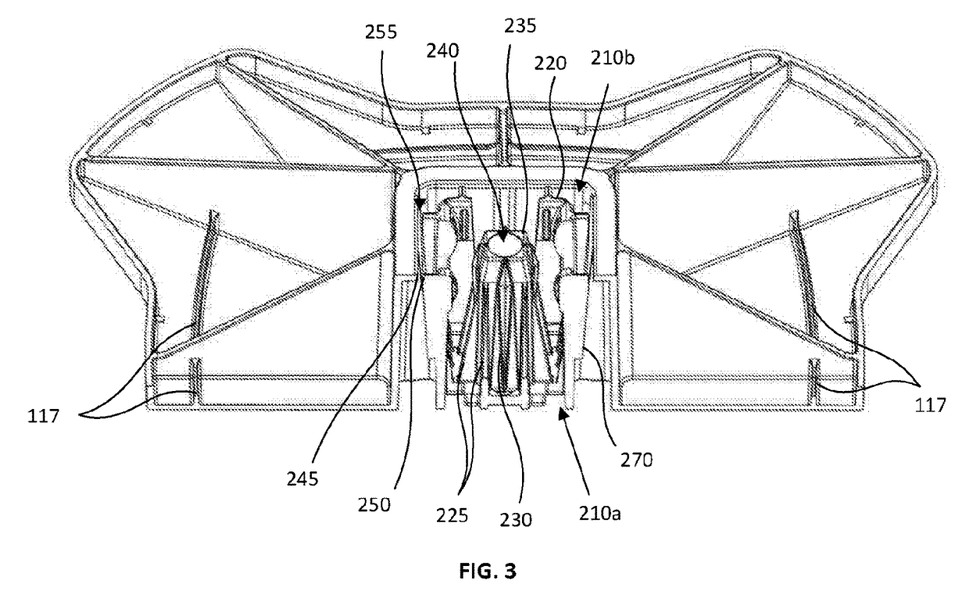
FIG. 3 illustrates a cross-sectional top perspective side view of the core.
Figure 4:
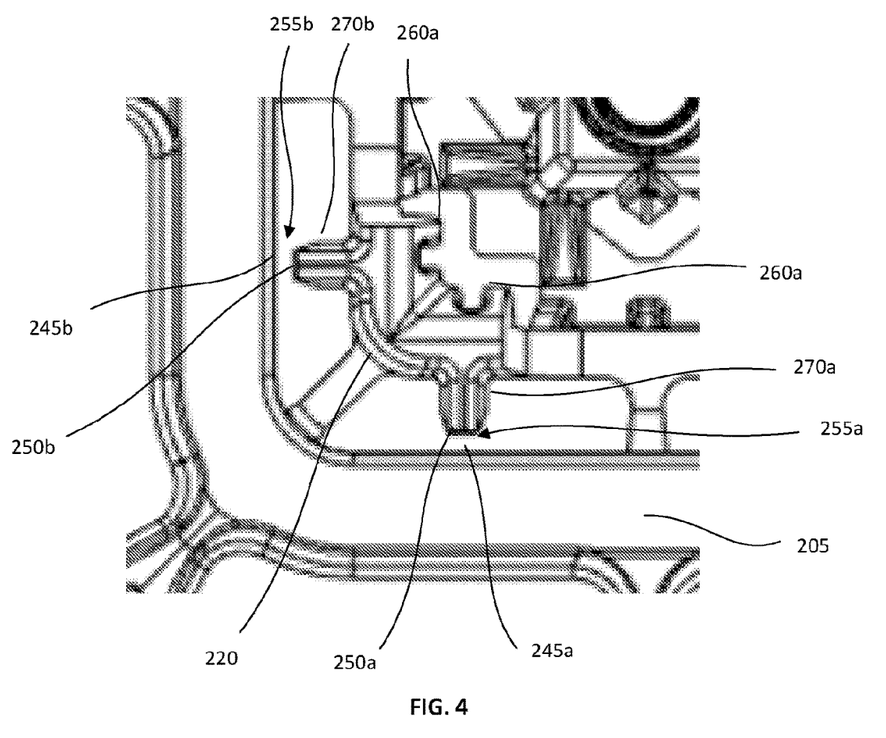
FIG. 4 illustrates a close-up view of a deformable arm of the core.

FIG. 1 illustrates a perspective view of a support foot 100 having a base 105 and a central portion 205 containing a core 200 configured to receive a section of a frame, such as those known in the art to support air-conditioning units off a support surface. One of the key benefits of the present invention is the core 200 can secure multiple different types of frames 300 (see also FIG. 7). For example, frames having a square or a rectangular cross-section can be inserted into the core 200 in a number of orientations due to the axisymmetric design of the core 200. This provides a considerably more versatile platform on which an installer can mount plant equipment, as there is no need to have specific support feet for a given application. The core is best illustrated in FIGS. 2 and 3, which illustrate plan and cross-sectional views of the core 200. The deformable arms 220 are best illustrated with reference to FIG. 4. Reference will be made to FIGS. 2 to 4 in the subsequent description.

The core 200 can be considered to have a first end 210a and a second end 210b, defining a longitudinal axis. Within the core 200 there are four deformable arms 220 that extend from a root at a first end 210a of the core 200 to a free distal end in a direction substantially parallel to the longitudinal axis of the core 200. The deformable arms 220 each have two protrusions 260 extending towards an opposed surface that is designed to secure the frame 300 in place by gripping onto the outer surface 310 of the frame 300 when inserted into the core 200. While four deformable arms 220 are described, it would be apparent that not all four deformable arms 220 are required, and that at its most basic, a single deformable arm 220 and an opposed surface would be suitable to secure the frame 300. Similarly, while two protrusions 260 are illustrated, it would be apparent that one or more protrusions 260 would be suitable to secure the frame 300.

The deformable arms 220 may each include a strut 270 to stiffen the deformable arm 220 and resist bending when receiving the frame 300. Each of the deformable arms 220 has an abutting surface 250 which is spaced from an inner surface 245 of the central portion 205. The space between the abutting surface 250 and the inner surface 245 defines a gap 255 into which the deformable arm 220 may deflect into when a frame 300 is inserted into the core 200. When the deformable arm 220 is deflected to its maximum extent, the abutting surface 245 and the inner surface 250 come into contact. FIG. 4 illustrates a close-up view of one of the deformable arms 220. The deformable arm 220 is L-shaped and has a first side having a first protrusion 260a and a first strut 270a having an abutting surface 250a configured to abut against a corresponding inner surface 245a on the central portion 205. The space between abutting surface 250a and inner surface 245a defines a first gap 255a. The deformable arm 220 also has a second side having a second protrusion 260b and a second strut 270b having an abutting surface 250b configured to abut against a corresponding inner surface 245b on the central portion 205. The space between abutting surface 250b and inner surface 245b defines a first gap 255b. As shown in FIGS. 2, 3 and 4, the abutting surface 250 is on the strut 270, but it would be understood that this need not be the case. It would be apparent that the strut 270 is not essential to the present invention. In this case, the abutting surface 250 may extend from the free distal end of the deformable arm 220. The abutting surface 250 may have a width and height, dimensions in the plane of the abutting surface 250, that substantially reduce bending of the material forming the abutting surface 250 when inserting or twisting a frame 300 (see FIG. 7) within the core 200. Where the central portion 205 is required to have a thickness above a certain threshold, it may be desirable to have a non-continuous cross-sectional area of the central portion. That is to say, the central portion 205 be may be hollowed out. One way of hollowing out the central portion 205 is to include one or more channels in the underside of the central portion 205 to reduce the thickness of some areas of the central portion 205. One advantage of this approach is to reduce the complexity of the tooling required to manufacture the support foot 100.

Figure 7A:
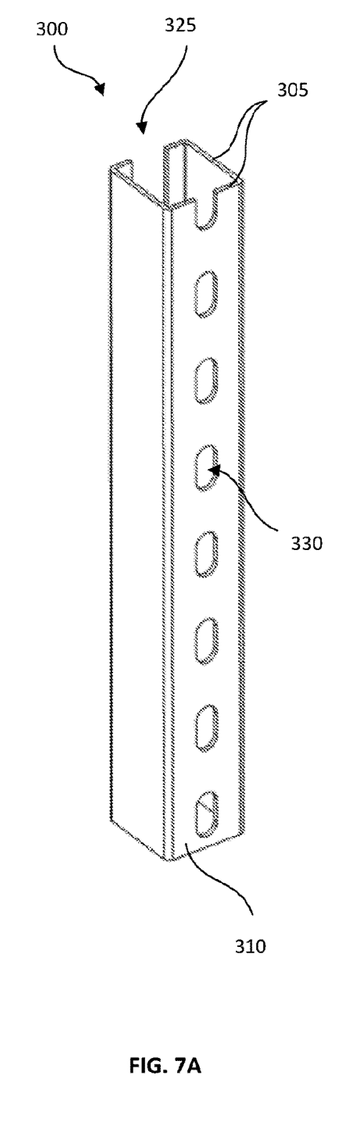
FIG. 7 illustrates exemplary frames that can be secured by the support foot.
Figure 7B:
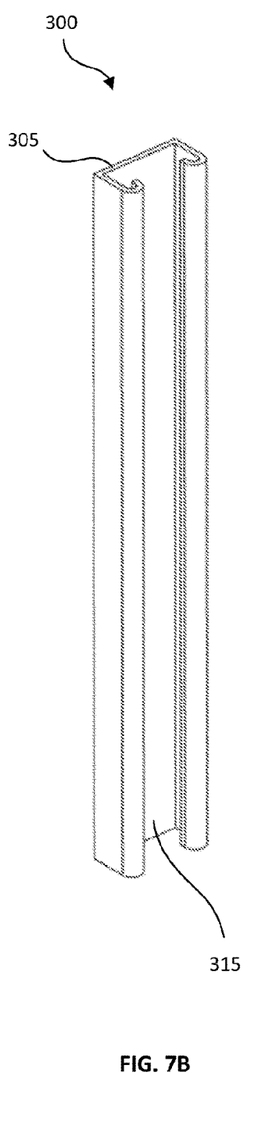
Figure 7C:
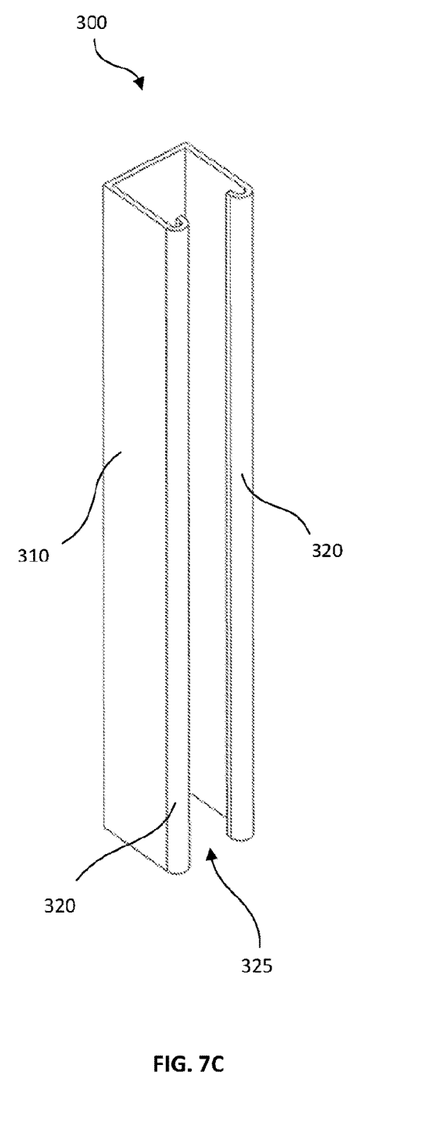
Figure 8:
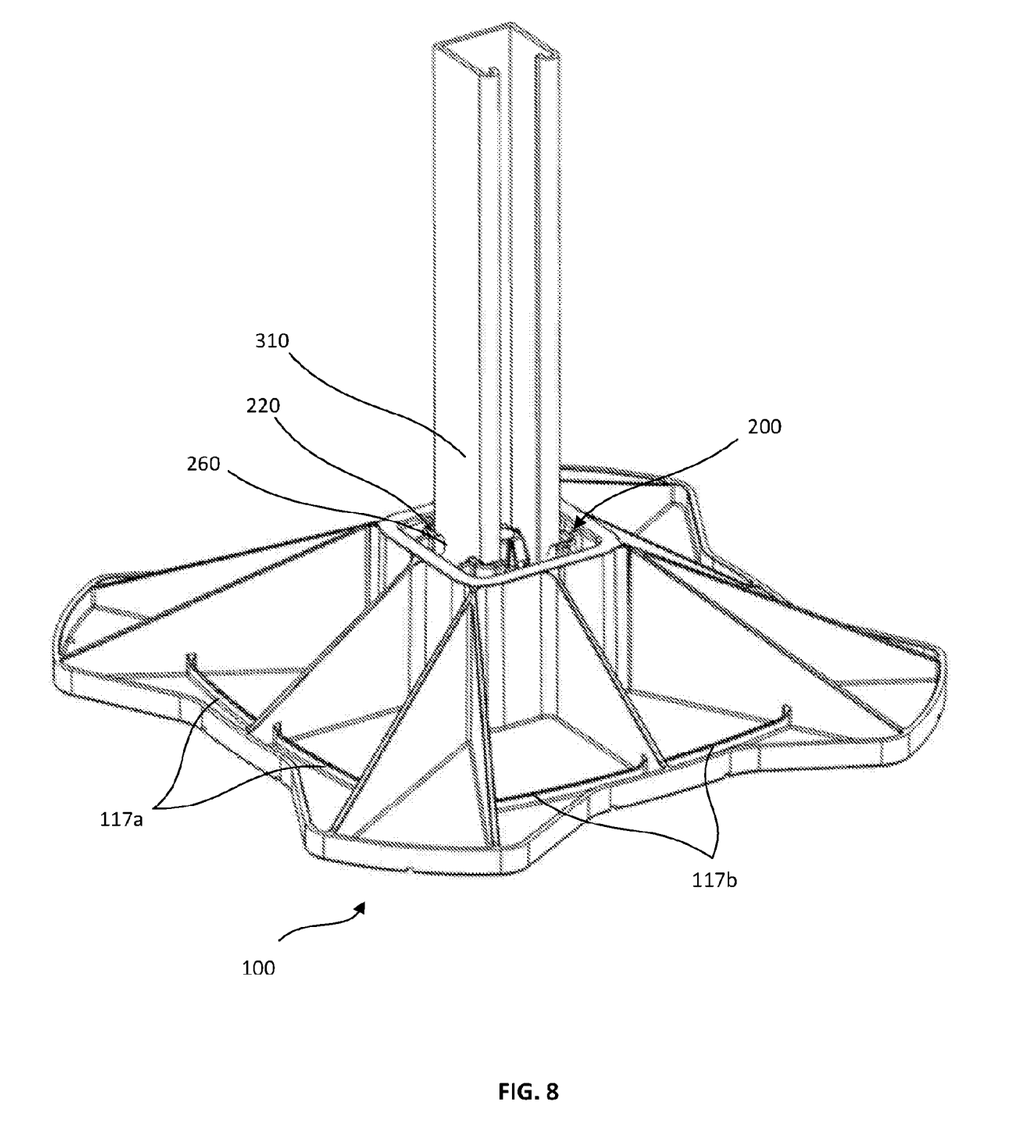
FIGS. 8 and 9 illustrate an exemplary frame secured within the support foot.

The deflection of each of the deformable arms 220 allows the core 200 to receive frames of different dimensions (see also FIG. 7). The frame 300 has a broadly rectangular or square profile formed of four sides 305. Each of the sides 305 has an outer surface 310 and an inner surface 315. The side wall 305 may also have one or more slots 330 for securing to further sections of frame 300 or equipment (not shown). One of the side walls may be formed as a channel 325 extending the length of the frame 300. The channel 325 may be defined by opposed edges 320. The edges 320 may be part of a rolled, bent or otherwise deformed side wall 305. In one example, the frame 300 may have dimensions of 41×41×1.5 mm. In a further example, the frame 300 may have dimensions of 41×41×2.5 mm. As the frame 300 is inserted into the core 200, geometric differences between the frame 300 and the deformable arms 220 may cause each of the deformable arms 220 to deflect by a first amount. In a further example, the frame 300 may have dimensions of 40×38×1.9 mm and may cause each of the deformable arms 220 to deflect by a second amount. In a further example, the frame 300 may have dimensions of 21×41×1.5 mm, and cause each of the deformable arms 220 to deflect by a third amount. In a further example, the frame 300 may have dimensions of 21×41×2.5 mm, and cause each of the deformable arms 220 to deflect by a fourth amount, which may be different to each of the first, second or third amounts. The first amount may be different to the second amount. The second amount may be different to the third amount. The third amount may be different to the first amount. Where there are multiple deformable arms 220, not all of the deformable arms 220 may be needed to secure the frame within the core 200. The frame 300 illustrated in FIG. 7B is one example of such a frame 300. The deformable arms 220 can be arranged in a square arrangement, as illustrated in FIGS. 2 and 3.

Figure 9:
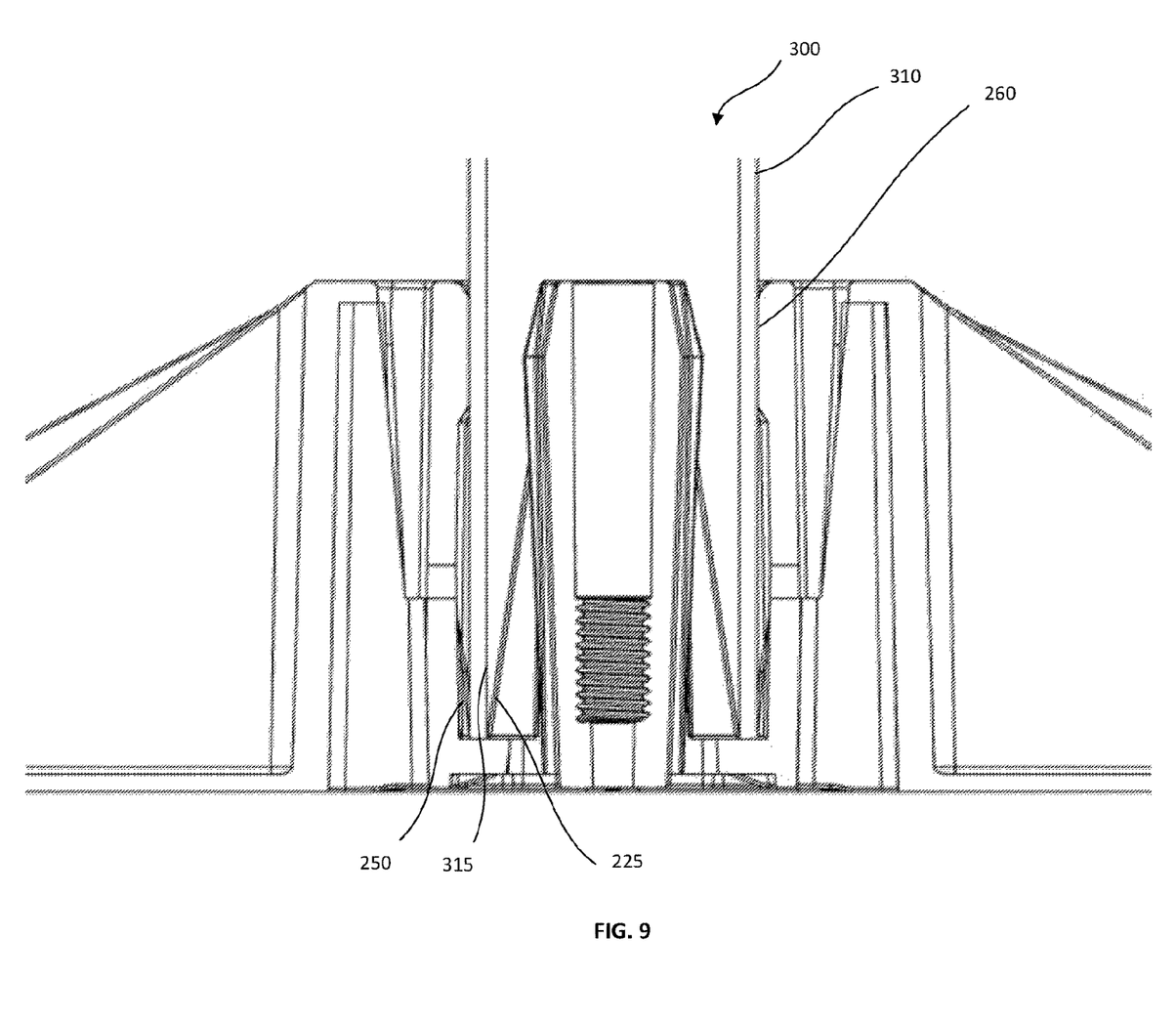

The inclusion of a vertical groove 262 in the protrusion 260, enables a part of the protrusion to be deformed or shaved off during insertion of the frame 300 into the core 200, thus defining a sacrificial region. The sacrificial region enables a tighter fit between the frame 300 and the core 200 (see also FIG. 9). The sacrificial region may be at the free end of the deformable arm 220. In combination with the resilient deflection of the deformable arms 220, this provides a more secure grip on the frame 300 by applying a compressive force to one or more of the outer surfaces 310 of the frame 300. While preferable, it is not essential for the vertical grooves 262a, 262b to be located midway across the respective protrusions 260a, 260b as shown in FIG. 4. The core 200 also has a plurality of nubs 250 at the first end 210a which extend away from the first end 210a of the core 200 and have a first surface facing an opposed surface which is arranged to contact the outer surface 310 of the frame 300, further enhancing the grip on the frame 300 (see FIG. 9). A plane may be defined by the contact points where the protrusion(s) 260 and nubs 250 contact the outer surface 310 of the frame 300 when fully inserted into the core 200. This plane may be parallel to the longitudinal axis of the core 200.

The core 200 is also shown having a central post 235 extending away from the first end 210a in a direction substantially parallel to and coincident with the longitudinal axis. While it is preferred that the central post 235 extends in a direction substantially parallel and coincident with the longitudinal axis, it would apparent that this is not essential. The central post 235 is shown having a substantially square cross-section, but it would be apparent that other cross-sectional profiles, such as an octagonal profile, may be possible. The cross-section of the central post 235 has first pair 275a of opposed faces arranged at 90 degrees to a second pair 275b of opposed faces. The central post 235 may have a threaded hole 240 to fixedly secure the frame to the core 200. It would be apparent that bolts are merely provided as one example of a threaded member and that screws or other similar fixings are included by this description. The central post 235 is also shown having a plurality of buttresses 225 and fingers 230 extending away from the first end 210a. The buttresses 225 strengthen the central post 235 and contact the inner surface 315 of the frame 300 when secured within the core 200. One or more of the buttresses 225 may have a tapered profile, where the taper narrows as the buttress 225 extends from the first end 210a to the second end 210b. The fingers 230 stiffen the central post 235 and each has a depth which is greatest at a point between the first 210a and second 210b ends and reduces as the fingers 230 extend towards the first 210a and second ends 210b. The buttresses 225 are configured to apply a force to the inner surface 315 of the frame 300 (see FIG. 9). This force on the inner surface 315 may be a reaction force to the compressive force exerted by the deformable arm 200 on to the outer surface 310 of the frame 300. Where the inner 315 and outer 310 surfaces of a side 305 of the frame 300 have forces applied to them, a pinching force further enhances the grip on the frame 300 within the core 200. Where there are pairs of buttresses 225 on opposed faces 275a of the central post 235, each buttress 225 may apply a force to the corresponding inner surface 315 to secure the frame 300 within the core 200. The combination of forces applied to the inner surfaces 315 of the frame 300 may be considered as an expansile force directed radially away from the central post and acting to prevent the frame 300 being pulled out of the core 200.

Referring back to FIG. 1, the support foot 100 may also include a plurality of ribs 120 that connect the central portion 205 to the upper-side 110a of the base 105. The ribs 120 increase the stiffness of the base 105 and provide a more stable platform on which to support plant equipment. By stiffening the base 105, load applied from the frame 300 through the core 200 is spread more evenly across the base surface 110b of the base 105 to the surface the support foot 100 is located on. The base surface 110b may be considered to be the surface of the base 105 that rests on the support surface. A more flexible foot is susceptible to bending, which in turn results in the load from the frame 300 being concentrated at the region of the feet directly below the frame 300. This concentration of stress can increase the risk of the support foot 100 becoming damaged and possibly failing, resulting in the sudden collapse of the frame supporting the equipment and potentially damaging the structure, for example a roof, on which the equipment is supported. Further, if the concentrated stresses are applied under the frame 300, the outer edges 125 will have a tendency to deflect upwards and away from the support surface, as the support surface presses against the whole of the base 105. By stiffening the base 105 using the plurality of ribs 120, the base 105 can be made from a thinner section of material, resulting in a lighter, yet stiffer, support foot 100. The support foot 100 is preferably made form nylon. The base surface 110b may be adhered to a rubber mat to provide additional protection to the support surface. The support foot 100 may be made from moulding processes, such as injection moulding.

As shown in FIG. 1, the plurality of ribs 120 are preferably arranged in a radial manner and extend from the central portion 205 around the core 200 to the upper-side 110a of the base 105. In the example illustrated in FIG. 10, four ribs 120B (also referred to as "middle ribs") extend substantially perpendicularly from the central portion 205 and eight ribs 120A (also referred to as "corner ribs") extend from the central portion 205 at an acute angle from a diagonal line extending across the base 105. The angle between the eight ribs 120 and the diagonal line is approximately 15±5 degrees. In some cases, one or more ribs 120 may extend along the diagonal line before splitting into multiple ribs that form an acute angle with the diagonal line. Where the corner ribs 120A are divergent at the central portion 205, this has been found to optimise the stiffness of the foot 100 without requiring excess material. It would be appreciated that the examples illustrated herein are merely exemplary arrangements of ribs 120 and that other arrangements are possible. In some cases, there may be one or three or more corner ribs extending into each lobe. In some cases, one corner rib may extend from the central portion 205 before splitting into two or more corner ribs. In some cases, one corner rib may extend from the central portion 205 to the perimeter of the base 105 and have one or more further ribs branch off along its length. The ribs 120 may each be formed as a solid web of material. In this instance, a pair of corner ribs 120A meet at each corner of the substantially square central portion 205, and a single middle rib 120B extends from a centre of each face of the central portion 205. While a preferred embodiment is illustrated, it would be apparent that one or more of the ribs 120 may be formed in other ways, for example as a series of interconnected elements (not shown), and that other arrangements of ribs 120 are possible depending on the requirements of the support foot 100. For example, the ribs 120 may have a curved top edge. In another case, one or more of the ribs 120 may have a profile comprising an arcuate section.

The support foot 100 may also have a perimeter wall 115 which circumscribes the base 105. Preferably, the perimeter wall 115 extends from the outer edge 125 of the base 105 away from the upper-side 110a and in a direction substantially parallel to the longitudinal axis. The perimeter wall 115 resists the base 105 bending, further enhancing the load distribution across the base surface 110b and stabilising the support foot 100. In the illustrated example, the perimeter wall 115 has a thickness of 3 mm and extends 10 mm from the upper side 110a. Further, as the ribs 120 extend between the central portion 205 and the perimeter wall 115, load exerted onto the support foot 100 in the core 200 will be transferred to the perimeter wall 115 and the outer edge 125 of the base 105, thus providing considerably more even distribution of load across the base surface 110b. In some cases, the base surface 110b will comprise a filleted, or rounded, perimeter. This is particularly advantageous where the base surface 110b is in direct contact with the roof or ground surface, as the otherwise sharp edge may cause damage to the roof or ground surface. This may be particularly so where the support foot 100 is not mounted on a level surface.

Figure 5:
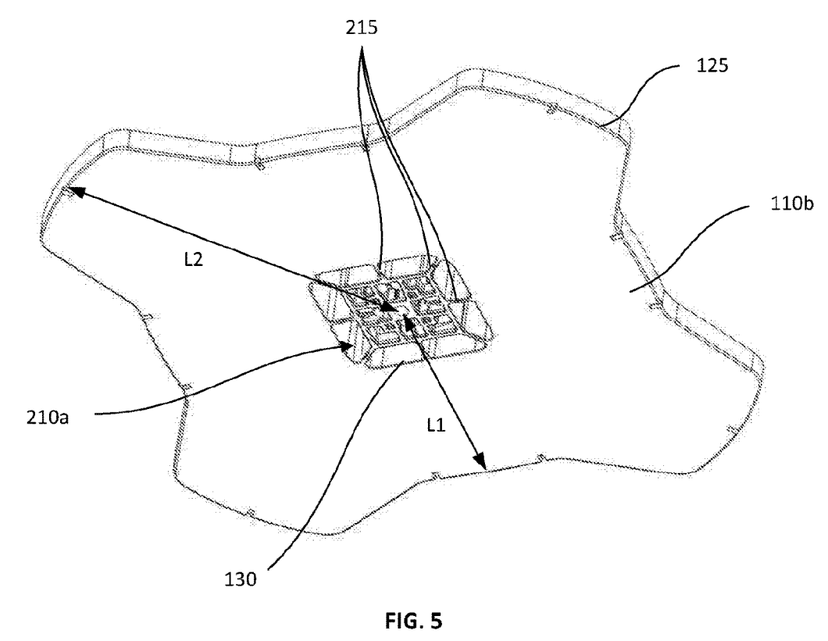
FIG. 5 illustrates a cross-sectional perspective underside view of the support foot.

The support foot 100 is also designed to distribute load evenly across the base surface 110b by suspending the core 200 off the ground surface using a series of bridges 215 extending between the core 200 and the central portion 205 at the first end 210a. Therefore, the base surface 110b is offset from the bottom surface 265 of the core (see FIG. 5), so that the weight of the equipment being supported by each support foot 100 is prevented from being transferred directly to the ground from the core 200. Instead, the load is required to pass through the central portion 205 and connected ribs 120 to the perimeter wall 115 and base 105. When viewed from a plan view, such as in FIGS. 2 and 4, it can be seen that the ribs 120 and the bridges 215 are aligned with one another. However, it would be apparent that such an arrangement is not essential to the present invention. A further advantage of a suspended core 200 is the reduced risk of corrosion or degradation of the frame 300 due to prolonged exposure to surface water that may accumulate on a roof or ground surface.

Figure 6:
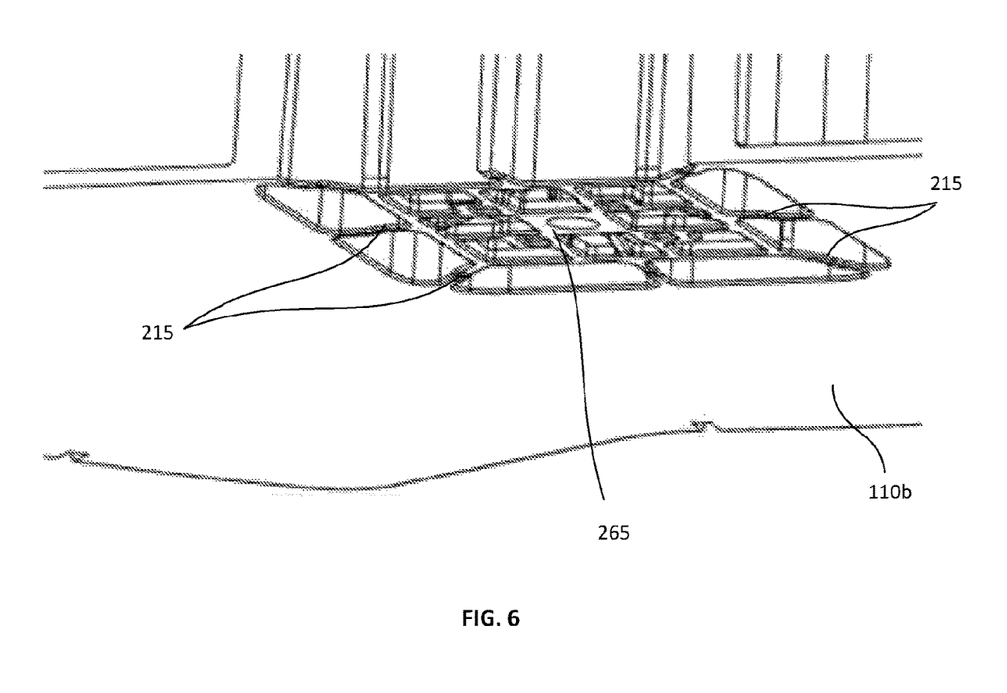
FIG. 6 illustrates a perspective underside view of the core suspended from a base surface of the support foot.

FIG. 6 illustrates a perspective underside view of the support foot 100. As illustrated, the base 105 has a lobed profile and has an inner edge 130 offset in a radial direction from the central portion 205. The base 105 has a first width ("L1") when viewed in a first cross-sectional plane and a second width ("L2") when viewed in a second cross-sectional plane offset to the first plane by an angle of between 30 degrees to 60 degrees. The second width may be larger than the first width. The support foot may have a first or second width between 300 mm to 650 mm. The lobed profile allows the footprint of the support foot 100 to be larger when compared to a when the base has a uniform width. By increasing the footprint of the support foot 100, the support foot 100 is made more stable as the tipping point is positioned further away from the centre than where a base of uniform width is used. For example, a support foot 100 made with the present lobed profile may have similar stability to a uniformly profiled foot, but with 20% less material.

As shown in FIG. 1, the areas of the base which are wider may have ribs 120 that extend from a mutual location at the central portion 205 across the wider sections of the base 105. This helps ensure load is transferred to the outer edge 125 all the way around and across the base 105.

The support foot 100 may further comprise a second wall 117 that substantially circumscribes the central portion 205 as illustrated in FIGS. 1, 3, 8 and 10. The second wall 117 acts to stiffen the base 105 and resist deformation when load is exerted onto the core 200. Where present, the second wall 117 may interconnect with one or more of the plurality of ribs 120. While the second wall 117 is described as circumscribing the central portion 205, the second wall 117 need not be formed as a single continuous wall. The second wall 117 preferably circumscribes the central portion in a series of spaced wall sections, as illustrated in the Figures. A series of spaced wall sections causes the areas of the base 105 where the second wall sections 117 are present to be stiffened. By incorporating a series of spaced wall sections, a refined approach to tune the bending characteristics of the base 105 is possible, using the minimum amount of material. Where the base 105 has a lobed profile, the wall sections 117 may be spaced across the lobes of the base 105. The second wall 117 may be arranged in a substantially square configuration. Each wall section 117a, 117b may be offset in a normal direction to the sides of the central portion 205. In one example, the second wall 117 is 2 mm thick. In one example, the second wall 117 is 5 mm high. In one example, the second wall 117 is offset from the perimeter wall 115 by 20 mm. In some cases, there may be further walls (not shown) disposed between the perimeter wall 115 and second wall 117 and/or between the second wall 117 and central portion 205. Where there are a series of walls between the perimeter wall 115 and the central portion 205, the series of walls may have different sizes. In one case, the series of inner walls may gradually reduce in size when going from the central portion 205 to the perimeter wall 115.

While the core 200 has been described as forming part of a support foot 100, it would be apparent that the features of the core 200 may be provided independently to the other features of the support foot 100. For example, the support foot 100 may have a central portion 205 configured to receive a collar (not shown) which contains a core 200 according to the present description. This would allow for the retrofitting of existing support feet where the central portion is simply a hole configured to receive a specific type of frame. In this case, the collar can be inserted into the central portion and provide a support foot with the benefits of the present invention.

Figure 10:
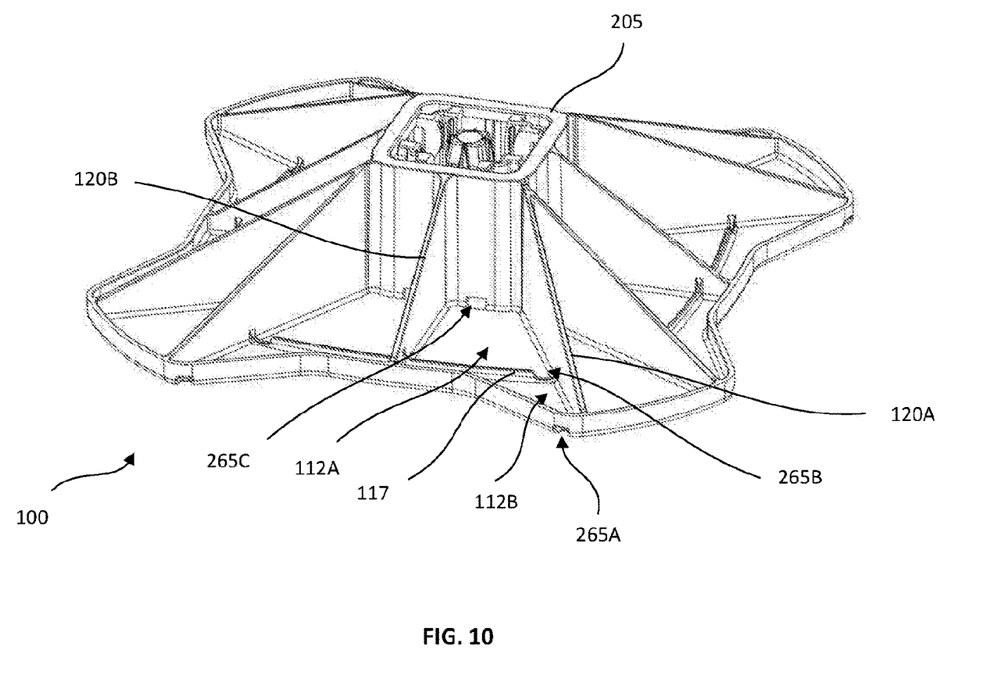
FIG. 10 illustrates a perspective view of a support foot having a plurality of drainage channels.

As illustrated in FIG. 10, a plurality of drainage channels 265 may be included in the support foot 100. This reduces the accumulation of liquid on the upper side 110a of the base 105. One way of providing a drainage channel 265 is through a plurality of ports 265A, 265B, 265C providing a fluid flow path for liquid to drain from the upper side 110a. As shown in FIG. 10, a first port 265A may be provided that extends between the perimeter wall 115 and base 105 of the support foot 100. This allows liquid retained within an outer region 112B between the second wall 117 and perimeter wall 115 to flow through the first port 265A and away from the support foot 100. A second port 265B within the second wall 117 is also provided to extend the drainage channel into an inner region 112A between the central portion 205 and the second wall 117. Preferably, the second port 265B extends from an upper edge of the second wall 117 towards the upper side 110a of the base 105. This is useful where liquid cannot drain through the first port 265A, for example, when the support foot is not level. A third port 265C extending through the central portion 205 and base portion 105 is also provided. The third port 265C allows liquid retained within the inner region 112A to drain away from under the core 200 of the support foot 100. In combination, the first 265A, second 265B and third 265C ports provide a fluid flow path that extends from the central portion 205 to the perimeter wall 115 via the inner region 112A and outer region 112B. It would be appreciated that one or more drainage channels 265 may be provided. This ensures liquid does not readily accumulate within or on the support foot 100 and cause either chemical damage (e.g. corrosion of connected frames) or biological damage (e.g. mould formation due to stagnant damp conditions near warm air-conditioning units).

The location of the ports 265A, 265B, 265C that make up the drainage channel 265 have also been chosen so as to lessen the reduction in stiffness of the support foot 100 due to the loss of material. The first port 265A is located adjacent to a rib 120A that extends into the lobed section of the base 105. As noted above, the first port 265A extends between the perimeter wall 115 and the base 105. In other words, the first port 265A extends through the junction between the perimeter wall 115 and the base 105, so as to preserve a portion of the perimeter wall 115 above the first port 265. This is to ensure the perimeter wall 115 is continuous around the perimeter of the support foot 100. The second port 265B is also shown located adjacent to the rib 120A that extends into the lobed section of the base 105. The second port 265B extends from an upper edge of the second wall 117 and extends towards the upper side 110A of the base 105. In some cases, the second port 265B may extend to the rib 120A that extends into the lobed section of the base 105. The third port 265C is located between rib 120A that extends into the lobed section of the base and rib 120B that extends to the first width (L1) as shown in FIG. 10. As the location of the ports 265A, 265B, 265C will influence the stiffness of the support foot 100, it would be apparent that in some cases, it may be desirable to have the ports 265A, 265B, 265C located in other locations. It would also be apparent that a drainage channel 265 may be provided using ports when the second wall 117 is not present. As shown in FIG. 10, it is possible to include at least one drainage channel 265 per radial section, the radial section being the area between neighbouring ribs 120.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A support foot for securing a frame member on a supporting surface, comprising:
   a base portion having a base surface for resting on said supporting surface; a central portion connected to the base portion, and
   a core having opposed first and second ends and a longitudinal axis extending between the first and second ends and configured to receive a frame member,
   wherein the core comprises a resiliently deformable member extending from a root at the first end to a free distal end in a direction substantially parallel to the longitudinal axis and spaced from an inner surface of the central portion, whereby to form a gap into which the resiliently deformable member can deform,
   wherein the resiliently deformable member is configured to deflect into the gap and away from an associated opposed surface,
   wherein the resiliently deformable member comprises a first surface configured to apply a first force to an outer surface of the frame member towards the associated opposed surface when the frame member is inserted into the core, and
   wherein the resiliently deformable member is configured to secure the frame member against said opposed surface when the frame member is inserted into the core.

2. The support foot according to claim 1, wherein the resiliently deformable member includes a strut member configured to resist bending of the resiliently deformable member.

3. The support foot according to claim 1, wherein the resilient deformable member includes resiliently deformable members, and the central portion includes an abutting surface adjacent to each of the resiliently deformable members against which each of the resiliently deformable members abuts when deflected to a maximum extent.

4. The support foot according to claim 1, wherein the first surface includes a protrusion extending towards the associated opposed surface.

5. The support foot according to claim 4, wherein the protrusion includes a vertical groove between the first surface and the associated opposed surface defining a sacrificial region that is configured to be removed during insertion of the frame member into the core.

6. The support foot according to claim 1, wherein the core further includes a central post extending from the first end towards the second end and having securing means to secure the frame member to the core.

7. The support foot according to claim 6, wherein the central post includes a buttress extending from the first end towards the second end, and wherein, during use, the buttress is configured to apply a second force to an inner surface of the frame member, whereby to grip the frame member.

8. The support foot according to claim 7, wherein the central post includes a second buttress on an opposed face of the central post to the first buttress, wherein, during use, the second buttress is configured to apply a third force to the inner surface of the frame member, and wherein the second and third forces are directed in opposed directions and exert an expansile force to opposed sides of the frame member.

9. The support foot according to claim 7, wherein the buttresses includes a depth that reduces from the first end to the second end.

10. The support foot according to claim 6, wherein the central post includes a finger having a depth and extending from the first end towards the second end, wherein the depth of the finger is greatest at a point between the first end and the second end.

11. The support foot according to claim 6, wherein the central post includes a first pair of opposed faces and a second pair of opposed faces arranged at 90 degrees to the first pair of opposed faces.

12. The support foot according to claim 1, wherein the resilient deformable member includes resiliently deformable members each having a contact surface configured to contact sides of the frame member.

13. The support foot according to claim 1, wherein the core further includes nubs extending from the first end and having a first surface facing a corresponding opposed surface, and wherein nubs and the resiliently deformable member are arranged to contact the frame member such that first surface of the nubs define a plane substantially parallel to the outer surface of the frame member when the frame member is secured within the core.

14. The support foot according to claim 1, wherein the central portion is connected to the base portion by bridge members at the first end.

15. The support foot according to claim 1, further comprising a wall member circumscribing the base portion, wherein the wall member extends in a direction parallel to the longitudinal axis and away from the base surface.

16. The support foot according to claim 15, further comprising a drainage channel having a first port formed within the central portion and a second port formed within the wall member, wherein any of the first port and second port extend through the base portion.

17. The support foot according to claim 16, further comprising a second wall section disposed between the wall member and the central portion and substantially circumscribing the central portion.

18. The support foot according to claim 17, wherein the drainage channel further includes a third port formed within the second wall section.

19. A support foot for securing a frame member on a supporting surface, comprising:
   a base portion having a base surface for resting on said supporting surface;
   a central portion connected to the base portion; and
   a core having opposed first and second ends and a longitudinal axis extending between the first and second ends located within the central portion and configured to receive a frame members;
   a wall member circumscribing the base portion wherein the wall member extends in a direction parallel to the longitudinal axis and away from the base surface; and
   a drainage channel having a first port formed within the central portion and a second port formed within the wall member, wherein either one of the first and second ports extends through the base portion.

20. A frame connector for connecting a frame member to a support foot having a base portion and a central portion connected to the base portion, whereby to secure the frame member on a surface, the frame connector comprising:
   a collar member configured to be received by a central portion of a support foot, and
   a core configured to receive a frame member and having opposed first and second ends and a longitudinal axis extending between the first and second ends,
   wherein the core includes a resiliently deformable member extending from a root at the first end to a free distal end in a direction substantially parallel to the longitudinal axis and spaced from an inner surface of the collar member, whereby to form a gap into which the resiliently deformable member can deform,
   wherein the resiliently deformable member includes a first surface configured to contact an outer surface of the frame member when the frame member is inserted into the core, and
   wherein the resiliently deformable member is configured to secure the frame member against an opposed surface when the frame member is inserted into the core.

* * * * *